Figure 1:
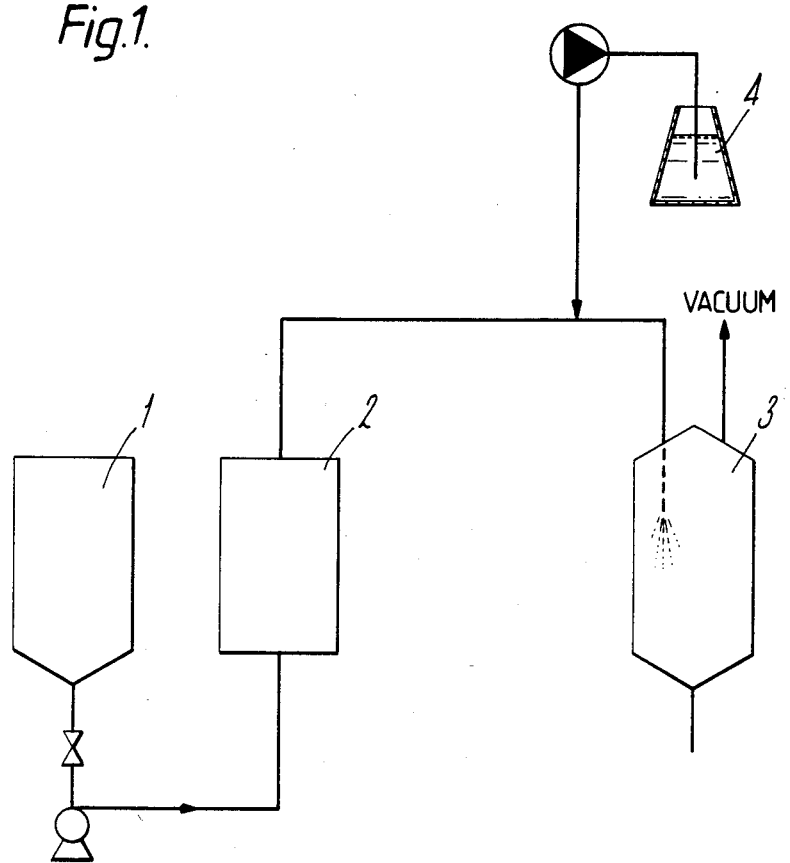

United States Patent [19]

Keulemans et al.

[11] Patent Number: 4,790,962

[45] Date of Patent: * Dec. 13, 1988

[54] PROCESS AND APPARATUS FOR THE INTERESTERIFICATION OF A TRIGLYCERIDE OIL AND PRODUCTS THEREFROM

[75] Inventors: Cornelis N. M. Keulemans, Rozenburg; Adrianus Rozendaal, Vlaardingen, both of Netherlands

[73] Assignee: Lever Brothers Company, New York, N.Y.

[ * ] Notice: The portion of the term of this patent subsequent to Apr. 29, 2003 has been disclaimed.

[21] Appl. No.: 814,154

[22] Filed: Dec. 23, 1985

Related U.S. Application Data

[63] Continuation of Ser. No. 595,848, Apr. 2, 1984.

[30] Foreign Application Priority Data

Apr. 5, 1983 [GB] United Kingdom ................ 8309143

[51] Int. Cl.$^4$ ............................................... C07C 3/02
[52] U.S. Cl. ................................................... 260/410.7
[58] Field of Search ..................................... 260/410.7

[56] References Cited

U.S. PATENT DOCUMENTS

| | | | |
|---|---|---|---|
| 2,309,949 | 2/1943 | Gooding | 260/410.7 |
| 2,474,740 | 6/1949 | Ittner | 260/410.7 |
| 2,738,278 | 3/1956 | Holman et al. | 260/410.7 |
| 2,878,274 | 3/1959 | Van Akkeren et al. | 260/410.7 |
| 2,999,021 | 9/1961 | Seestrom et al. | 260/410.7 |
| 3,095,431 | 6/1963 | Giddings et al. | 260/410.7 |
| 3,170,798 | 2/1965 | Burgers et al. | 426/601 |
| 3,271,434 | 9/1966 | Baenitz | 260/410.7 |
| 4,263,216 | 4/1981 | Volpenheim | 260/410.7 |
| 4,284,578 | 8/1981 | De Lathauwer et al. | 260/410.7 |
| 4,335,156 | 6/1982 | Kogan et al. | 260/410.7 |
| 4,419,291 | 12/1983 | De Lathauwer et al. | 260/410.7 |
| 4,585,593 | 4/1986 | Keulemans et al. | 260/410.7 |

Primary Examiner—Paul J. Killos
Attorney, Agent, or Firm—Gerard J. McGowan, Jr.; James J. Farrell

[57] ABSTRACT

The process is a discontinuous process wherein the oil is subjected to interesterification in a discrete charge and comprises bringing together streams comprising respectively at least a portion of a charge of triglyceride oil and catalyst solution of water, alkali metal, hydroxide and glycerol, homogenizing the mixture, reducing its water content, and interesterifying. The process can be performed either as a semi-continuous process or as a circulatory batch process. Preferably the homogenization and drying steps are combined and are performed by passage through a spray drying nozzle. The spray drying nozzle preferably sprays the mixture directly into the reaction vessel.

21 Claims, 2 Drawing Sheets

PROCESS AND APPARATUS FOR THE INTERESTERIFICATION OF A TRIGLYCERIDE OIL AND PRODUCTS THEREFROM

This is a continuation, application of Ser. No. 595,848, filed Apr. 2, 1984.

The present invention relates to a process and an apparatus for the interesterification of fats and oils and to the fats and oils so treated. In the present specification the terms "fats" and "oils" are used interchangeably.

Molecular rearrangement of triglycerides is a tool well known in the art to adjust the physical characteristics of a fat or oil. Interesterification of the fatty acid moieties can for example alter the melting point of a triglyceride composition without substantially affecting its overall fatty acid composition.

To bring about the interesterification reaction it is usual to employ a catalyst of some sort. JAOCS 44 414A (1967) is a review article and describes a variety of catalyst sytems. One of the publications referred to in the article is U.S. Pat. No. 3,170,798 which describes a process in which the oil is placed in a reaction vessel and the catalyst comprising a mixture of water, an alkali metal hydroxide and glycerine is stirred into the oil. Before the randomisation reaction will take place water present in the reaction mixture must be driven off. Accordingly after a catalyst mixture comprising 0.02% to 0.08% by weight of alkali metal hydroxide in the form of an aqueous solution containing from 1% to 12% hydroxide and from about 0.10% to 0.30% glycerine, is dispersed in the oil the resulting mixture is heated to at least 120° C. to allow water to be driven off and hence the randomisation reaction to proceed. The reaction is stopped by inactivating the catalyst by adding an edible acidic material, capable of neutralising alkali metal soaps, in an amount equal to 1 to 5 equivalents of alkali metal hydroxide dispersed in the fatty esters prior to reaction. The acidic material serves to split soap present in the mixture to form free fatty acids which dissolve in the oil and which can be removed by conventional refining techniques. The amount of acidic material added is preferably limited to an amount which will result in the formation of a maximum of 0.7% free fatty acid. Any remaining soap and acid salts formed can be removed by filtration. The process described in U.S. Pat. No. 3,170,798 thus provides a means of removing soap present in the oil which soap can be produced both by the action of the catalyst and in any pre-neutralising step should it be required.

In our co-pending application No. EP 82 305266 we describe an improved process for interesterifying a triglyceride oil employing as a catalyst solution a mixture of water, alkali metal hydroxide and glycerol as applied to a continuous process.

According to a first aspect of the present invention there is provided a process for the interesterification of a triglyceride oil employing a catalyst solution comprising a mixture of water, an alkali metal hydroxide and glycerol, wherein the oil is subjected to interesterification in a discrete charge, the process comprising (i) bringing together streams comprising respectively the catalyst solution and at least a part of a charge of oil; (ii) homogenising the combined oil phase and catalyst solution by subjection to energetic shear; (iii) reducing the water content of the homogenised mixture so as to allow the formation of an active catalyst component and (iv) holding the resulting mixture at a temperature sufficient to cause interesterification.

The present process thus provides an improved process for interesterifying a triglyceride oil employing as a catalyst solution a mixture of water, alkali metal hydroxide and glycerol as applied to a discontinuous process. Treatment of an oil in discrete charges can be preferable over a continuous process where for example smaller amounts of an oil are to be treated. Suitably the present process can be operated as a semi-continuous process or as a batch process.

Where only a part of a charge of oil forms the stream which is dosed with the catalyst solution the remainder of the charge is suitably admixed with the dried resulting mixture of homogenised oil and catalyst solution. Preferably the remainder of the charge is in a stirred vessel into which the dried resulting mixture is fed. Alternatively however the dosing of the catalyst solution can be arranged so that a complete charge of oil is brought into contact with the stream of catalyst solution.

The oil can be heated to a temperature sufficient to cause interesterification prior to contact with the catalyst solution or the homogenised mixture of oil and catalyst and optionally additional oil can be heated to a temperature to cause interesterification The process can be operated as a semi-continuous process in which a stream of catalyst solution and a stream of oil are brought together from their respective sources for example on site storage or buffer tanks. Operation as a semi-continuous process can be preferable where it is desired to heat the oil/catalyst mixture after contact to an interesterification temperature. Heating can be performed either as the resulting mixture is collecting in a reaction vessel or once the collection is completed. Alternatively the process can be operated as a circulatory batch process in which a charge of oil is contained in a reaction vessel and is at least in part circulated to form a stream which is brought into contact with the stream of catalyst solution and the resulting mixture returned to the reaction vessel where interesterification occurs. Circulation can continue for as long as is required to effect dosage of the catalyst solution or longer. The circulatory batch process can suitably be employed where it is desired to heat the oil prior to contact with the catalyst solution. The charging of the reaction vessel with oil prior to contact with the catalyst solution allows the oil to be readily dried to a preferred water content eg. <0.01 wt % if required. Drying can be achieved by heating under reduced pressure and/or use of eg. nitrogen.

Drying of the oil to a water content of less than 0.03 wt %, preferably less than 0.02 wt % even more preferably less than 0.01 wt % is suitably carried out. Drying can suitably be performed by heating under reduced pressure or by nitrogen sparging and can conveniently occur in both the semi-continuous and the batch embodiments during filling of the reaction vessel and after.

In operation of the present process the confluence of the two streams followed by homogenisation can allow a very fine and rapid dispersion of the aqueous catalyst solution to be achieved in the oil. The size of the aqueous droplets determines the rate of water removal as well as the surface area between the catalyst and the oil and can thus influence the time necessary to complete the interesterification reaction We have for example found that aqueous droplets as small as about $10^{-5}$ m can be achieved on homogenisation, which on water removal give catalyst particles of from about 2 to about 10 μm which effectively bring about interesterification.

Use of the present process can moreover allow very short contact times between the initial confluence of the streams and the subsequent removal of water. Due to the variety of reactions which can occur on admixture of the catalyst solution and the oil the prompt removal of water to a value of less than 0.03 wt %, preferably less than 0.01 wt % (as measured by the Karl-Fischer method), is advantageous in furthering the desired interesterification reaction. The water is necessarily present initially to act as a carrier for the alkali hydroxide and glycerol and to aid their dispersal in the oil and is moreover produced by the formation of the catalyst.

The following are the more important reactions which are thought to occur following admixture of the two streams:

1.
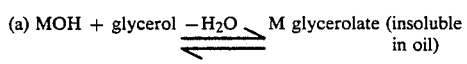

Rate of reaction (b) is increased in the presence of mono- and diglycerides.

2.
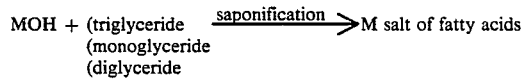

Rate of reaction is increased in presence of water.

3.
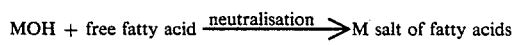

Removal of water from the system thus encourages the equilibrium of reaction 1(a) to shift in the desired direction towards the M glycerolate and discourages reaction 2. The discouragement of the saponification reaction reduces the amount of triglyceride and alkali metal hydroxide lost.

The presence of mono and diglycerides is believed to affect the rate constant of reaction 1 in two ways. Firstly the mono and diglycerides preferentially undergo interesterification compared to triglycerides. During their interaction with the catalytic solution an intermediate is formed, which is believed to be M diacylglycerol or M monoacylglycerol which promotes the interesterification of the triglycerides. Secondly mono and diglycerides also preferentially saponify compared to triglycerides. The portion of mono and diglycerides which therefore undergoes saponification before the reaction is substantially halted due to the removal of the water, provides soaps which, in addition to the mono and diglycerides remaining in the reaction mixture, produce an emulsifying action with respect to the immiscible phases. The more important contribution, particularly that of the monoglycerides, to enhancing the overall interesterification rate of the triglycerides is however the first mechanism outlined above. In each particular application of the present process optimum conditions should therefore be chosen to further the desired reactions. For example rapid removal of water from the system to a low level favours the enhancing effect of the mono and diglycerides present.

The consecutive steps of homogenisation and water removal are preferably carried out in one operation by passing the mixture through a spray nozzle into a low pressure chamber. Homogenisation occurs due to the dissipation of energy on passing through the nozzle. Control of the pressure drop across the nozzle can thus determine the degree of homogeneity. The pressure drop across the nozzle is preferably more than 2 bar, more preferably more than 4 bar and preferably less than 20 bar. Alternatively, a homogenisation step employing for example a static mixer or restriction can be performed prior to the water removal. In such a case the drying step could for example comprise rotating disc spray drying or thin film drying. To achieve adequate water removal flash drying is thus preferably performed with the drying pressure in the low pressure chamber, which may, for example, be a spray drying tower, being preferably less than 20 mb, more preferably less than 10 mb.

It has been found possible to limit the contact time between the streams prior to drying to about 1 second or less. Brief contact time prior to drying is preferable to further the desired reactions to take place as explained above. Preferably the contact time is less than 20 seconds, more preferably less than 5 seconds. The precise upper limit will vary with the oil and catalyst employed as well as the design of the system. Where for example the confluence of the streams takes place some distance ahead of the homogenisation step and the streams run co-currently with litle intermixing occurring the overall contact time prior to drying may for example be about 1 minute without detrimentally affecting the interesterification reaction. Preferably however the time between the homogenisation step occurring and the water removal step is less than 20 secs, more preferably less than 5 secs, more preferably less than 1 sec.

The interesterification temperature is preferably in the range of from 100° to 160° C., more preferably in the range of from 125° to 150° C. The temperature selected depends on the overall desired reaction rate. The reaction rate increases with increase in temperature, but is also dependent on the degree of homogeneity and water removal achieved in the mixture and on the catalyst composition and concentration. An acceptable reaction time was achieved employing a temperature of eg. 135° C.

The catalyst concentration as well as the relative proportions of each component of the catalyst solution can be varied over a relatively wide range. Suitably for a catalyst comprising sodium hydroxide/glycerol/water the weight ratios of the three components should be respectively between 1/2/2 and 1/2/7. Caesium hydroxide, potassium hydroxide or lithium hydroxide can be employed in place of sodium hydroxide. The relative rates of reaction for the four alkali metal hydroxides are Li<Na<K<Cs which must be taken into account, in addition to their atomic weights, when considering the optimum relative weight ratios for a catalyst mixture comprising LiOH, KOH or CsOH in place of NaOH.

The concentration of the catalyst with respect to the oil depends inter alia on the oil employed, but in general it has been found possible to interesterify a neutral oil blend successfully employing a catalyst having for example a minimum sodium hydroxide concentration, based on the oil, from 0.05 to 0.1% wt. The higher limit to the amount of NaOH concentration with respect to the oil is determined by the tolerance allowed with respect to oil losses due to saponification. In practice the NaOH concentration with respect to the oil is preferably not above 0.3 wt %, more preferably not above 0.15 wt %.

In a batch circulatory process embodying the present invention the oil to be interesterified is preferably placed in a reaction vessel having an outlet through which oil can be extracted from the vessel and passed in the form of a stream to a junction point at which it meets the dosed catalyst solution. Where a spray dry nozzle is employed to homogenise and dry the mixture, it is suitably located in the reaction vessel so as to deposit the homogenised and dried mixture into the bulk of the oil blend. The vessel can contain stirrer means to admix the bulk of the oil phase with the catalyst/oil phase mixture and heating means. Circulation of the oil phase can continue for as long as is required to dose the catalyst solution or longer. The interesterification reaction proceeds in the reaction vessel and can be stopped when completed in a known manner.

In a semi-continuous process embodying the present invention the catalyst solution and oil blend to be interesterified can be brought together from their respective sources, homogenised and dried, with the resulting reaction mixture being fed to a reaction vessel where it can be collected and the interesterification reaction allowed to proceed. Where a spray dry nozzle is employed the homogenised dried reaction mixture is preferably sprayed from the nozzle directly into the vessel in which the reaction is performed. The vessel is preferably equipped with a stirrer and with heating means. The reaction can be stopped in a known manner.

According to a second aspect of the present invention there is provided apparatus for the interesterification of a triglyceride oil employing a catalyst solution comprising a mixture of water, an alkali metal hydroxide and glycerol wherein the apparatus comprises, in series, inlet lines arranged to bring in use the catalyst solution and oil respectively into contact with each other, means adapted to homogenise the catalyst solution and oil, means adapted to remove water from the homogenised mixture and a reactor adapted to collect the mixture and to maintain the mixture at a temperature for interesterification to occur.

The means to homogenise the catalyst solution and oil and the means to remove water from the resulting mixture are preferably combined and provided by a spray drying nozzle. Alternatively, a separate homogenisation means for example a static mixer or restriction can be provided before the drying means in the direction of flow. The drying means can then be for example a rotating disc spray drying nozzle or thin film dryer. The spray drying nozzle preferably sprays the mixture directly into the reactor. Preferably the reactor is a vessel which has an outlet which connects with the inlet line carrying the oil so that in use in the batch circulatory process the oil phase in the reactor can be circulated for dosing with the catalyst solution.

The present process can conveniently be carried out using the above apparatus.

It is to be understood that the present invention extends to the interesterification products of the present process and to products manufactured therefrom.

The present process and apparatus can be employed for a wide variety of triglyceride oils including vegetable, animal, marine, hydrogenated and fractionated oils and mixtures thereof. Examples of particular oils include soyabean oil, sunflower oil, palm oil, coconut oil, cottonseed oil, safflower seed oil, rapeseed oil and fish oil. In particular the present process and apparatus can be employed for the interesterification of oils and fats employed in large quantities as in for example the margarine industry. Margarine may be prepared from the present oil and fats by conventional techniques.

Figure 2:
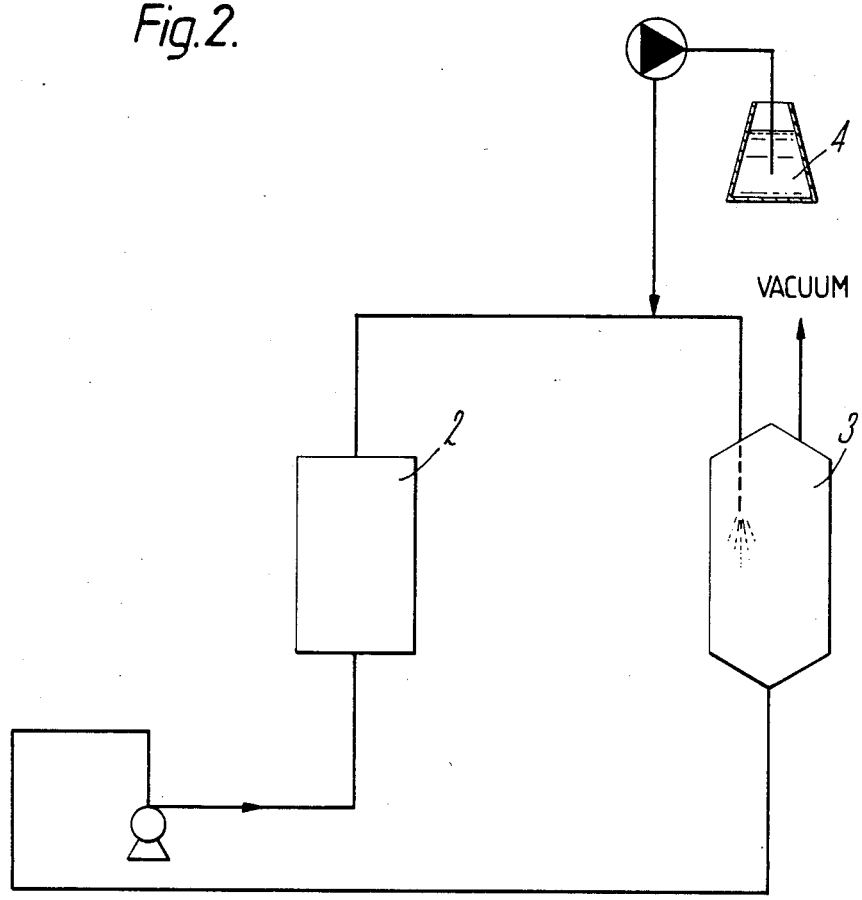

Embodiments of the present invention will now be described by way of example only with reference to the accompanying drawings and the following experimental examples; wherein:

FIG. 1 is a schematic diagram showing apparatus for performing a semi-continuous process embodying the present invention; and FIG. 2 illustrates in a schematic form apparatus for performing a circulatory batch process embodying the present invention.

Referring firstly to FIG. 1 an oil source 1 is connected by way of a pump to an in-line heater 2. An outlet from the heater 2 leads to a junction with an outlet from a catalyst solution source 4. The combined lines lead to a spray drying nozzle which sprays into an evacuated reactor vessel 3. An outlet leads from the base of the vessel.

Referring to FIG. 2 a closed circulation system comprises a reactor vessel 3, an outlet leading by way of a pump through an in-line heater 2 to a junction point with catalyst solution source 4 and then to a spray drying nozzle which sprays directly to the evacuated reactor vessel 3. Although not shown in the drawing the system includes an inlet for oil so that the oil can pass through the heater 2 prior to entry into the vessel 3 and an outlet from the vessel to remove treated oil.

In both sets of apparatus the reactor vessel is supplied with stirring and with heating means. The spray drying nozzles employed were Steinen nozzles of various designs and dimensions.

In operation in the semi-continuous process the oil is pumped from the storage vessel 1, through the heater 2, dosed with the catalyst solution and spray dried into the reactor vessel 3. The oil and catalyst solution may be homogenised, dried and received in the reactor vessel 3 at approximately the interesterification temperature or the mixture may be received in the vessel 3 at a lower temperature and subsequently heated in the vessel 3. In operation in the batch process the reactor vessel is filled with the oil, dried to a water content of <0.01%, circulated and dosed with the catalyst solution. In both processes nitrogen dosing of oil in the reactor vessel 3 may be employed to improve drying. In each of the following examples the delay between homogenisation and water removal was less than 1 sec and between the confluence of the streams and water removal less than 20 secs.

In the following examples four blends of oils were employed:

Blend A: 5 wt % sunflower oil hardened to a melting point of 69° C. and 95 wt % soyabean oil Blend B: 25 wt % sunflower oil, 25 wt % sunflower oil hardened to a melting point of 41° C. and 50 wt % sunflower oil hardened to a melting point of 32° C.

Blend C: blend of 60 wt % palm oil and 40 wt % coconut oil

Blend D: 5 wt % soyabean oil hardened to a melting point of 65° C. and 95 wt % unhardened soyabean oil.

The reactions were monitored as a function of the reaction time.

EXAMPLE 1

Experiments were performed using the semi-continuous process. The temperature of the blend was monitored just before spraying ($T_{spray}$ °C.) and on filling into vessel 3 ($T_{filling}$ °C.) and the time taken to heat the mixture in vessel 3 to the interesterification temperature of 135° C. The vessel 3 was heated as it filled with the oil. The catalyst employed was a 1/2/3 mixture of NaOH/glycerol/water in an amount of 0.1% NaOH with respect to the oil. The headspace in the vessel 3 was at a pressure of $\leq 7$ mbar. The throughput of oil was 100 kg/hr. The stirrer in the vessel 3 was operated at a speed of 195 rpm. The dosing of the catalyst solution took place for the whole period during which the vessel 3 was being filled with oil and lasted for 45 minutes. The nozzle was a TM41-90°. The pressure drop over the nozzle was 3 bar. The reaction time at 135° C. was 30 minutes.

Table I below gives the temperatures employed and shows that substantially complete interesterification ($\geq 90\%$) occurred with a filling temperature lower than the reaction temperature.

TABLE I

| Oil | $T_{spray}$(°C.) | $T_{filling}$(°Co.) | Heating time to 135° C. (min) | % interest |
|---|---|---|---|---|
| Blend D | 150 | 100 | 20 | $\geq 90$ |
| Blend D | 150 | 100 | 60 | $\geq 90$ |
| Blend D | 120 | 100 | 17 | $\geq 90$ |
| Blend B | 140 | 120 | 10 | $\geq 90$ |

EXAMPLE 2

In a series of experiments embodying the semi-continuous process the preheated oil and the catalyst solution were sprayed into an initially unheated vessel 3. $T_{filling}$°C. in Table II below gives the initial temperature of the oil on entering vessel 3 and the final temperature of the oil when filling was completed. In the first two entries in Table II no additional heating was necessary. For the remainder the vessel 3 was then heated to an interesterification temperature of 135° C. at a rate of 0.5° C./min.

The catalyst employed was a 1/2/3 solution of NaOH/glycerol/water at an amount of 0.1 wt % NaOH with respect to the oil. The nozzle was TM41-90°. The pressure drop over the nozzle was 3 bar. The headspace pressure in the vessel 3 was $\leq 7$ mbar and the stirrer speed 195 rpm. The throughput of oil was 100 kg/hr and the filling time 45 mins. In some cases, as noted in Table II, the catalyst dosing did not take as long as the overall filling time. In each case however substantially complete interesterification ($\geq 90\%$) had occurred within 30 mins of the reaction mixture being held at the reaction temperature.

TABLE II

| Oil | $T_{spray}$(°C.) | $T_{filling}$(°C.) initial | $T_{filling}$(°C.) final | dosing time (min) | % interest |
|---|---|---|---|---|---|
| Blend D | 150 | 60 | 130 | 45 | $\geq 90$ |
| Blend D | 140 | 60 | 130 | 45 | $\geq 90$ |
| Blend A | 120 | 30 | 84 | 15 | $\geq 90$ |
| Blend A | 135 | 30 | 100 | 15 | $\geq 90$ |
| Blend A | 147 | 30 | 107 | 15 | $\geq 90$ |
| Blend C | 135 | 20 | 85 | 45 | $\geq 90$ |

EXAMPLE 3

In the semi-continuous process the effect of nitrogen dosing through the oil/catalyst mixture in vessel 3 was investigated. The spraying, filling and reaction temperature were each 125° C. The oil employed was Blend C and the catalyst a 1/2/3 solution of NaOH/glycerol/water in an amount of 0.1 wt % NaOH with respect to the oil. The nozzle was Steinen TM41-90°. The pressure drop across the nozzle was 3 bar. The pressure of the headspace of vessel 3 was $\leq 7$ mbar and the stirrer speed was 195 rpm. The catalyst dosing time was 15 minutes. The nitrogen was dosed for 5 minutes through the oil/catalyst mixture in the vessel 3 at a through rate of 300 l/h after dosing of the catalyst solution.

The beneficial effects of nitrogen dosing are given in Table III below in terms of time required to achieve stated degree of interesterification:

TABLE III

| $N_2$ | % interest | $t_{int}$(min) |
|---|---|---|
| No | 80 | 30 |
| Yes | $\geq 90$ | 15 |

The nitrogen dosing is believed to aid the water removal. When nitrogen sparging is employed the overall water content of the oil is reduced to below 0.01 wt %. When no nitrogen sparging is used the overall water content of the oil is of the order of 0.02 to 0.03 wt %. Increased degree of drying is believed to make isothermal spraying, filling and interesterification viable.

EXAMPLE 4

In a circulatory batch process oil predried to a water content of less than 0.01 wt % $H_2O$ was placed in the vessel 3 and heated to the interesterification temperature. Circulation was then commenced with concomitant catalyst dosing.

The throughput circulation rate of the oil was 100 kg/hr, the pressure headspace $\leq 7$ mbar and the stirrer speed 195 rpm. The nozzle was a TM41-90° (Steinen). The pressure drop across the nozzle was 3 bar. The catalyst was 0.1 wt % NaOH with respect to the oil as a 1/2/3 NaOH/glycerol/water mixture.

The results are given in Table IV.

TABLE IV

| Oil | $T_{interest}$(°C.) | dosing time (min) | $t_{interest}$ (min) | % interest |
|---|---|---|---|---|
| Blend A | 125 | 15 | 45 | $\geq 90$ |
| Blend A | 135 | 15 | 45 | ~90 |
| Blend B | 125 | 15 | 30 | $\geq 90$ |

EXAMPLE 5

Experiments were performed employing the batch circulatory process to investigate the effect of free fatty acids in the oils and the benefits of nitrogen dosing through the oil in vessel 3 during catalyst dosing.

The oil was circulated at a throughput of 200 kg/h. The reaction temperature was 130° C. and the catalyst was 0.1 wt % NaOH as an 1/2/3 NaOH/glycerol/water solution dosed in 15 minutes. The headspace pressure in vessel 3 was 7 mbar and the stirrer speed was 40 rpm. The nozzle had a 2.0 mm entrance orifice with a right angular opening. The pressure drop across the nozzle was 12 bar.

The results in terms of degree of interesterification in stated reaction time are given in Table V below.

TABLE V

| Oil | ffa (%) | $t_{int}$ (min) | % interest | $N_2$(l/h) |
|---|---|---|---|---|
| Blend B | 0.02 | 15 | ≧90 | — |
| Blend B | 0.04 | 20 | ~90 | — |
| Blend A | 0.03 | 10 | ≧90 | — |
| Blend C | 0.24 | 30 | ≦10 | — |
| Blend C | 0.24 | 30 | 70 | 300 |

The results appear to show that a higher amount of free fatty acid may be tolerated if the drying conditions are improved by nitrogen dosing. When nitrogen dosing is employed the water content of the oil is reduced to less than 0.01 wt %. In the absence of nitrogen dosing the water content is higher.

We claim:

1. A process for the interesterification of a triglyceride oil employing a catalyst solution comprising a mixture of water, an alkali metal hydroxide and glycerol, wherein the oil is subjected to interesterification in a discrete charge, the process comprising (1) bringing together streams comprising respectively the catalyst solution and at least a part of a charge of oil, (ii) passing the combined streams through a spray nozzle into a low pressure chamber and thereby (a) homogenizing the combined oil and catalyst solution by subjection to energetic shear, and (b) reducing the water content of the homogenized mixture within a period of 20 seconds so as to allow the formation of an active catalyst compnent and (iii) holding the mixture at a temperature sufficient to cause interesterification.

2. A process according to claim 1 wherein any remainder of a charge of oil is admixed with the said resulting mixture of oil and catalyst solution.

3. A process according to claim 1 wherein the catalyst solution is brought in step (i) into contact with a complete charge of oil.

4. A process according to claim 1 wherein the oil is at the temperature sufficient to cause interesterification prior to contact with the catalyst solution.

5. A process according to claim 1 wherein the resulting mixture of oil and catalyst solution and any remainder of an oil charge is heated to a temperature sufficient to cause interesterification.

6. A process according to claim 1 comprising a semi-continuous process in which catalyst solution and a stream of oil are brought together from respective sources.

7. A process according to claim 1 comprising a circulatory batch process in which a charge of oil is contained in a reaction vessel and is at least in part circulated to form a stream which is brought into contact with the stream of catalyst solution and the resulting mixture returned to the reaction vessel.

8. Process according to claim 1 wherein the water content of the mixture is reduced to less than 0.03 wt % with respect to the total weight of the mixture.

9. Process according to claim 8 wherein the water content is reduced to less than 0.01 wt % with respect to the total weight of the mixture.

10. Process according to claim 1 wherein the oil contains less than 0.1 wt % free fatty acids with respect to the oil.

11. Process according to claim 10 wherein the oil and catalyst mixture is subjected to a pressure drop of at least 2b.

12. Process according to claim 11 wherein the pressure drop is at least 4b.

13. Process according to claim 12 wherein the pressure in the chamber is less than 20 mb.

14. Process according to claim 13 wherein the pressure in the chamber is less than 10 mb.

15. A process according to claim 1 wherein contact time between the oil and the catalyst solution prior to completion of step (iii) is less than 5 seconds.

16. Process according to claim 15 wherein the contact time is less than 1 second.

17. Process according to claim 1 wherein the interesterification is performed at a temperature between 100° and 160° C.

18. Process according to claim 17 wherein the interesterification is performed at a temperature between 125° and 150° C.

19. Process according to claim 17 wherein step (ii) is performed within the temperature range employed for step (iv).

20. Process according to claim 19 wherein step (ii) and is performed at a temperature approximately the same as that employed for step (IV).

21. Process according to claim 1 wherein the catalyst contains, with respect to the oil, at least 0.03 wt % sodium hydroxide.

* * * * *